(12) United States Patent
Jo et al.

(10) Patent No.: US 9,975,285 B2
(45) Date of Patent: May 22, 2018

(54) DEVICE FOR MANUFACTURING INTERIOR MATERIAL HAVING HOLLOW

(71) Applicants: Hyundai Motor Company, Seoul (KR); Kia Motors Corporation, Seoul (KR)

(72) Inventors: Kwang Rae Jo, Gimhae-si (KR); Dae Ik Jung, Suwon-si (KR); Jong Heon Lee, Suwon-si (KR); Seung Kwon Cha, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 171 days.

(21) Appl. No.: 14/960,003

(22) Filed: Dec. 4, 2015

(65) Prior Publication Data

US 2017/0008203 A1    Jan. 12, 2017

(30) Foreign Application Priority Data

Jul. 7, 2015  (KR) .......................... 10-2015-0096238

(51) Int. Cl.
*B29C 45/14*  (2006.01)
*B29C 45/00*  (2006.01)
(Continued)

(52) U.S. Cl.
CPC .... *B29C 45/0046* (2013.01); *B29C 45/14786* (2013.01); *B29C 45/14836* (2013.01);
(Continued)

(58) Field of Classification Search
CPC .......... B29C 45/0046; B29C 45/14786; B29C 45/14836; B29C 45/2708; B29C 2045/2709
See application file for complete search history.

(56) References Cited

U.S. PATENT DOCUMENTS 2,423,700 A * 7/1947 Hardy ................... B21D 53/78
                                                    244/134 C
4,560,523 A * 12/1985 Plumley ................ B29C 70/443
                                                    264/102
(Continued)

FOREIGN PATENT DOCUMENTS

JP    2002-347069 A    12/2002
KR    1999-0023716 U    7/1999
(Continued)

*Primary Examiner* — Robert B Davis
(74) *Attorney, Agent, or Firm* — Morgan, Lewis & Bockius LLP (57) ABSTRACT

A device for manufacturing an interior material having a hollow, which forms an injection body below a cloth by inserting the cloth between an upper mold and a lower mold and closing a mold and thereafter, injecting a resin between the cloth and the lower mold, may include a filling area part in which the resin is fillable and a non-filling area part in which filling the resin is cut off, which are formed between the upper mold and the lower mold, the non-filling area part being positioned in the filling area part; and a reference gate for supplying the resin injected between the upper mold and the lower mold to the filling area part, which is formed in the non-filling area part.

7 Claims, 5 Drawing Sheets

(51) Int. Cl.
*B29C 45/27* (2006.01)
*B29L 31/30* (2006.01)
(52) U.S. Cl.
CPC ...... *B29C 45/2708* (2013.01); *B29K 2713/00* (2013.01); *B29L 2031/3041* (2013.01)

(56) References Cited

U.S. PATENT DOCUMENTS

| | | | | |
|---|---|---|---|---|
| 5,045,251 A | * | 9/1991 | Johnson | B29C 33/76 |
| | | | | 264/102 |
| 5,076,760 A | * | 12/1991 | Weetman | B01F 7/00016 |
| | | | | 264/155 |
| 5,132,069 A | * | 7/1992 | Newton | B29C 70/48 |
| | | | | 264/257 |
| 2008/0054528 A1 | * | 3/2008 | Chueh | B29C 45/2708 |
| | | | | 264/328.12 |

FOREIGN PATENT DOCUMENTS

| | | |
|---|---|---|
| KR | 10-2004-0089210 A | 10/2004 |
| KR | 10-2006-0003552 A | 1/2006 |
| KR | 10-2006-0028471 A | 3/2006 |
| KR | 10-2007-0034210 A | 3/2007 |
| KR | 10-0985311 B1 | 10/2010 |
| KR | 10-2014-0095623 A | 8/2014 |
| WO | WO 2013/015020 A1 | 1/2013 |

* cited by examiner

DEVICE FOR MANUFACTURING INTERIOR MATERIAL HAVING HOLLOW

CROSS-REFERENCE TO RELATED APPLICATION

The present application claims priority to Korean Patent Application No. 10-2015-0096238 filed on Jul. 7, 2015, the entire contents of which is incorporated herein for all purposes by this reference.

BACKGROUND OF THE INVENTION

Field of the Invention

The present disclosure relates to a device for manufacturing an interior material having a hollow therein. More particularly, it relates to a device for manufacturing an interior material having a hollow, which is used for preventing a cloth from being creased at the time of manufacturing the interior material manufactured to have the cloth on the surface thereof.

Description of Related Art

In general, an interior material serving as both finishing and an ornament for an internal surface is attached to fronts of a driverime oat and a passenger's seat and the inside of a door in an interior of a vehicle and the interior material is manufactured by considering various requirement performance including durability, texture, the sense of touch, a sense of beauty, stability, and the like.

Figure 1:
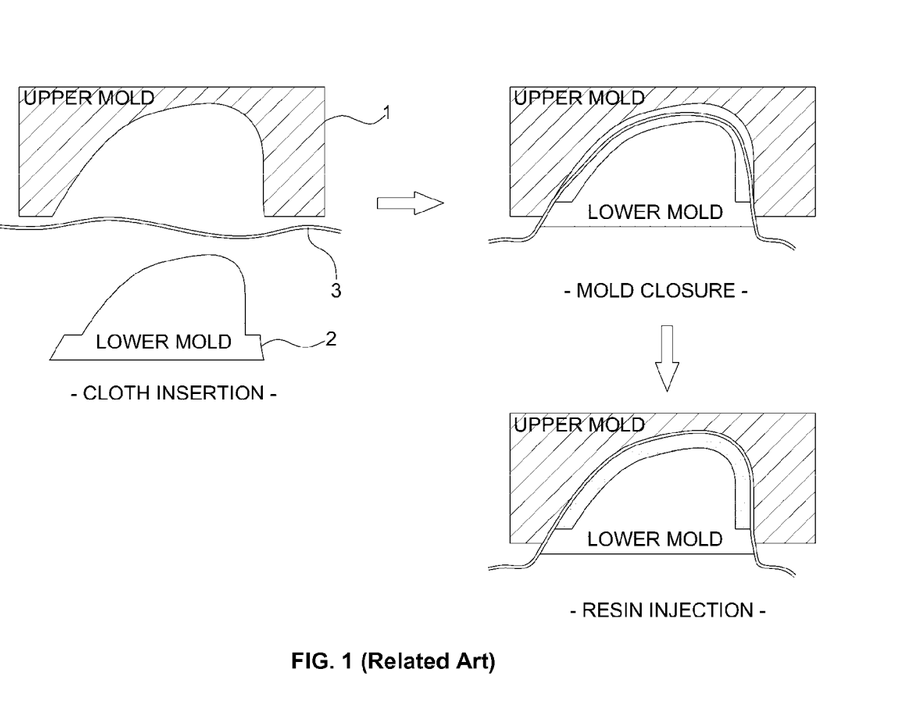
FIG. 1 is an exemplary diagram illustrating a method for manufacturing an interior material for a vehicle in the related art.

FIG. 1 is an exemplary diagram illustrating a method for manufacturing an interior material for a vehicle in the related art.

Referring to FIG. 1, in the related art, a cloth 3 is inserted between an upper mold 1 and a lower mold 2 of a mold for injection body forming of the interior material and the mold is closed and thereafter, a plastic resin is injected between the cloth 2 and the lower mold 3 in the closed mold to injection-form an injection body, thereby manufacturing an interior material constituted by the injection body having the cloth on the surface thereof.

However, when the interior material is manufactured by the method in the related art, since a mold having a resin injection hole (alternatively, gate) is used only at a location, injection pressure of the plastic resin needs to increase as the shape of the injection body is larger, and the cloth cannot be resistant to the injection pressure with the increase of the injection pressure, and as a result, problems such as surface damage and resin leakage (the resin leaks out of the cloth) occur.

When the interior material is manufactured by the method in the related art, since it is impossible to control a filling direction of the resin injected into the mold, the cloth is creased or the resin cannot be generally filled between the lower mold and the cloth at the time of manufacturing the injection body having a complicated shape, and a distance which the resin that is filled through the resin injection hole reaches in order to complete forming of the injection body is too far and as a result, a problem such as hardening of the resin before forming the injection body is completed occurs, thereby making the forming of the injection body be difficult.

In order to solve the problem, the interior material constituted by the injection body having the large size or the injection body having the complicated shape is manufactured while being divided into two or more and in this case, as the number of parts increases, the number of processes increases and a problem is caused, in which exterior marketability deteriorates due to a connection portion between the separately manufactured parts.

Figure 2:
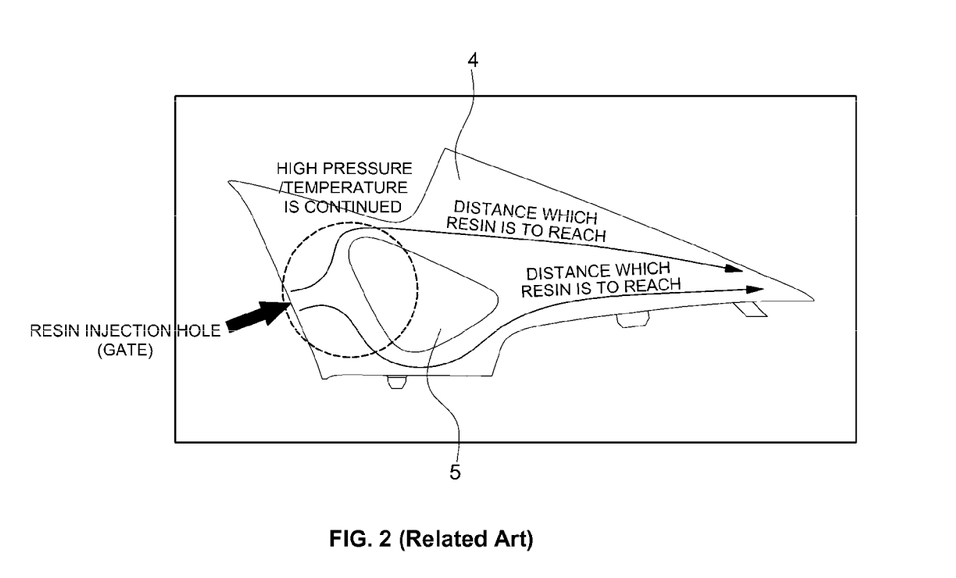
FIG. 2 is a diagram for describing a problem which occurs at the time of manufacturing an interior material having a hollow therein by the method for manufacturing the interior material in the related art.
Figure 3:
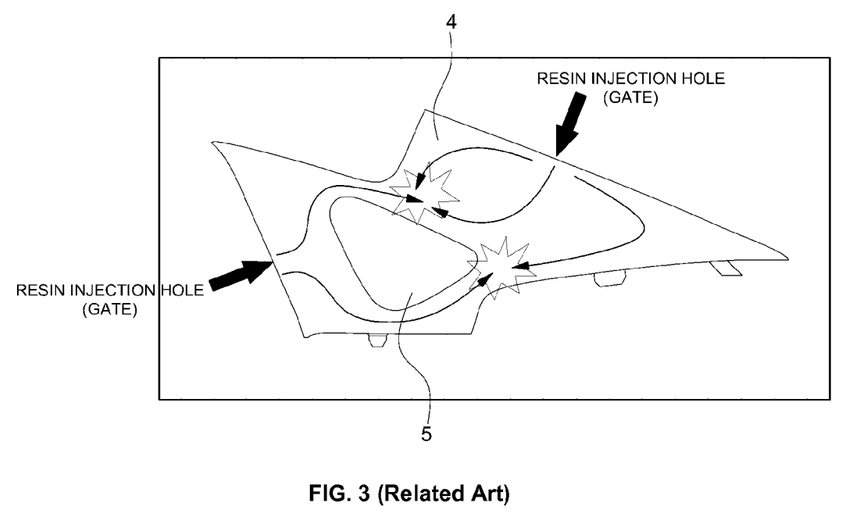
FIG. 3 is a diagram for describing a problem which occurs at the time of manufacturing the interior material by using a mold having two or more resin injection holes in the related art.

Meanwhile, FIG. 2 is a diagram for describing a problem which occurs at the time of manufacturing an interior material having a hollow therein by the method for manufacturing the interior material in the related art and FIG. 3 is a diagram for describing a problem which occurs at the time of manufacturing the interior material by using a mold having two or more resin injection holes in the related art.

As illustrated in FIG. 2, in order to form the injection body of the interior material having the hollow therein, when the injection body of the interior material is intended to be formed by injecting the plastic resin between the cloth input into the mold and the lower mold as described above, since the plastic resin filled between the cloth and the lower mold needs to be injected while continuously maintaining high pressure and temperature, the high pressure and temperature are continuously applied to the edge of the resin injection hole until the resin reaches a final point (a point in which the plastic resin injected from the resin injection hole needs to finally reach in order to complete forming the injection body, and as a result, the cloth is damaged due to the high pressure and high heat.

Since it is impossible to predict a flowing direction of the resin filled between the cloth and the lower mold, when the resin permeates the cloth, pulling, slack, crease, and the like of the cloth occur in the flowing direction of the resin.

Since the cloth is exposed on the surface of the interior material to form an exterior when the interior material is applied to a vehicle body, marketability deteriorates when the cloth is creased and damaged.

In order to solve the problem, when the interior material is manufactured by using the mold having two or more resin injection holes, as the plastic resin is injected simultaneously through the plurality of resin injection holes as illustrated in FIG. 3, the resins injected through the respective resin injection holes collide with each other, and the cloth is creased and depressed at collision points and further, since it is still impossible to control the flowing direction of the resin even though two or more resin injection holes are used, there is a possibility that the pulling, the slack, the crease, and the like of the cloth will occur at a predetermined point.

For reference, in FIGS. 2 and 3, reference numeral 4 represents an area where the resin is filled between the cloth (alternatively, upper mold) and the lower mold at the time of forming the injection body of the interior material having the hollow therein and reference numeral 5 represents a area where the resin is not filled between the cloth (alternatively, upper mold) and the lower mold at the time of forming the injection body of the interior material having the hollow therein.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for manufacturing an interior material which can increase marketability by preventing a cloth from being creased while forming an injection body below the cloth by injecting a resin between the cloth (alternatively, upper mold) and a lower mold at the time of forming the injection body of an interior material having a hollow therein.

In one aspect, the present invention provides a device for manufacturing an interior material having a hollow, which forms an injection body below a cloth by inserting the cloth between an upper mold and a lower mold and closing a mold and thereafter, injecting a resin between the cloth and the lower mold, including: a filling area part in which the resin is Tillable and a non-filling area part in which filling the resin is cut off, which are formed between the upper mold and the lower mold, the non-filling area part being positioned in the filling area part; and a reference gate for supplying the resin injected between the upper mold and the lower mold to the filling area part, which is formed in the non-filling area part.

In a exemplary embodiment, two or more gate paths that guide the resin injected between the upper mold and the lower mold to reach the filling area part through the reference gate may be formed in the non-filling area part.

In another exemplary embodiment, one or more subordinated gates for secondarily supplying the resin to the filling area part after injecting the resin by using the reference gate may be formed in the filling area part, the subordinated gate may be disposed on the edge of the resin filled in the filling area part for a predetermined time after the reference gate is opened in order to supply the resin to the filling area part, in detail, the subordinated gate may be disposed on a filling boundary which is an edge positioned in the filling area part among the peripheries of the resin filled in the filling area part for the predetermined time after the reference gate is opened in order to supply the resin to the filling area part.

In still another exemplary embodiment, when the filling area part of which a partial area is filled by the resin jetted from the reference gate is bidivided into a resin filled area in which the resin is filled and a resin non-filled area in which the resin is not filled, only one subordinated gate may be configured in the filling area part to fill the entirety of the resin non-filled area.

In yet another exemplary embodiment, when the filling area part of which a partial area is filled by the resin jetted from the reference gate is divided into one resin filled area in which the resin is filled and two or more resin non-filled areas in which the resin is not filled, two or more subordinated gates may be configured in the filling area part in order to fill all of the resin-non-filled areas.

In the device for manufacturing the interior material according to the present invention, the reference gate for injecting the resin between the cloth input into the mold and the lower mold is configured in the non-filling area part of the lower mold and extends to the edge of the non-filling area part adjacent to the filling area part, and as a result, the resin injected through the reference gate applies tension to the cloth in a direction to be diffused toward the outside of the non-filling area part while flowing from the non-filling area part to the filling area part based on the reference gate, and as a result, the tension applied to the cloth is consistently generated outward based on the reference gate, thereby preventing the cloth from being creased by the flow of the resin.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, it will be described such that the present invention can be easily executed by those skilled in the art.

The present invention relates to a mold device for manufacturing an interior material for a vehicle, which is constituted by a cloth disposed on the surface and an injection body integrally molded below the cloth, and particularly, to optimize and set the position of a gate for injecting a resin in a mold in order to prevent the cloth from being creased during molding the injection body below the cloth at the time of manufacturing the plate-shaped interior material having a hollow therein.

A device for manufacturing the interior material according to an exemplary embodiment of the present invention, as a mold device for manufacturing the plate-shaped interior material having the hollow therein, forms an injection body below a cloth by inserting the cloth between an upper mold and a lower mold and closing a mold and thereafter, injecting a plastic resin between the cloth and the lower mold.

Figure 4A:
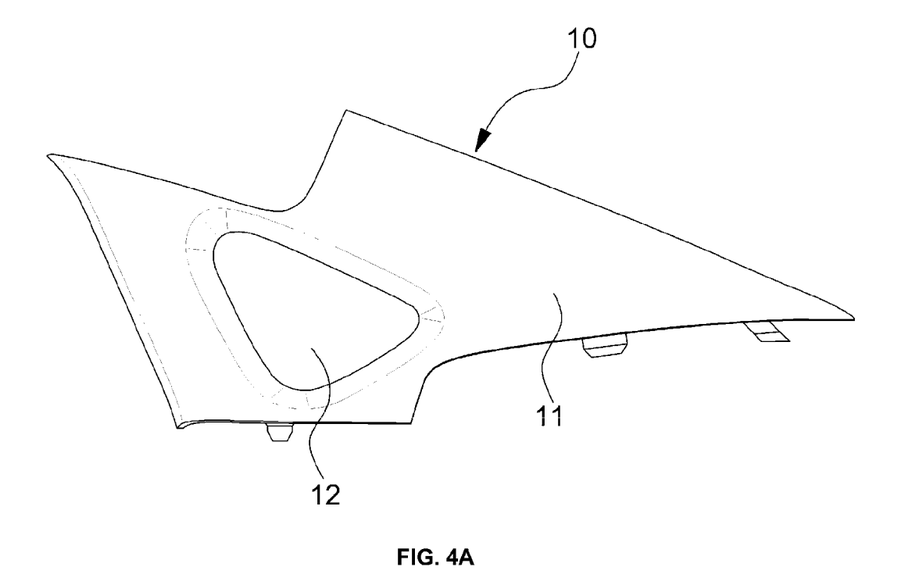
FIG. 4A and FIG. 4B are diagrams illustrating an interior material manufactured by using a device for manufacturing the interior material according to an exemplary embodiment of the present invention and a reference gate setting position of the interior material manufacturing device.
Figure 4B:
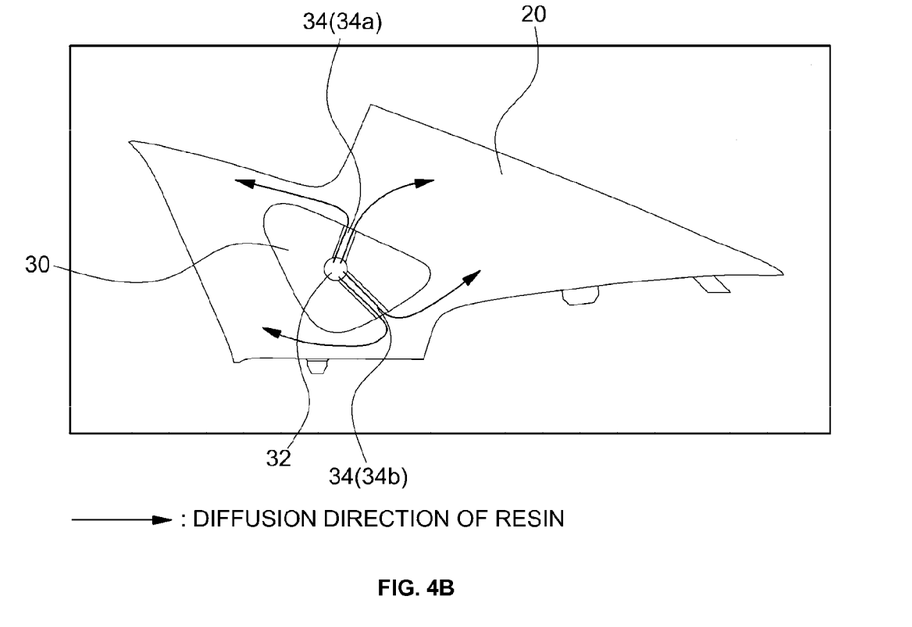

FIG. 4A and FIG. 4B are diagrams for describing a reference gate setting position of the interior material manufacturing device according to the exemplary embodiment of the present invention. FIG. 4A is an exemplary diagram illustrating an interior material having a hollow therein and FIG. 4B is a schematic view illustrating a filling area part formed between an upper mold and a lower mold at the time of closing a molding device for manufacturing the interior material of FIG. 4A.

Referring to FIG. 4A and FIG. 4B, when a cloth is inserted into the molding device and the molding device is closed, a filling area part 20 in which a plastic resin may be filled between an upper mold and a lower mold is formed in a sealed structure and an injection body 11 of an interior material 10 is formed below a cloth by the resin filled in the filling area part 20.

A non-filling area part 30 that may cut off filling of the plastic resin is provided in the filling area part 20 in order to form a hollow 12 in the injection body 11 at the time of forming the injection body 11 and the non-filling area part 30 may be positioned in the filling area part 20 and configured on the top of the lower mold.

In other words, the filling area part 20 is an area in which the resin injected between the upper mold and the lower mold is filled in order to form the injection body 11 and the non-filling area part 30 is an area in which the resin is not filled to form the hollow 12 of the injection body 11 at the time of forming the injection body.

A reference gate 32 is provided in the non-filling area part 30 in order to inject the resin injected into the filling area part 20. That is, a reference gate 32 for injection-supplying the resin injected between the upper mold and the lower mold to the filling area part 20 is formed in the non-filling area part 30.

Since the reference gate 32 for injecting the resin is positioned in the non-filling area part 30 for forming the hollow 12 of the injection body 11, and as a result, the resin is filled in the filling area part 20 while being diffused toward the outside of the non-filling area part 30 based on the non-filling area part 30, tension applied to the cloth by the flow of the resin is consistently formed and maintained toward the outside of the non-filling area part 30 to prevent the cloth from being creased due to the flow of the resin at the time of forming the injection body below the cloth.

A gate path 34 that guides the resin injected between the upper mold and the lower mold to reach the filling area part 20 through the reference gate 32 is formed in the non-filling area part 30.

The gate path 34 is provided in the non-filling area part 30 (the inside or the top of the non-filling area part) and extends between the reference gate 32 and the filling area part 20 to allow the resin supplied from the reference gate 32 to be injected to the filling area part 20.

In order to form a flow in which the resin that flows from the reference gate 32 to the filling area part 20 is diffused to the outside of the non-filling area part 30 based on the non-filling area part 30, the gate path 34 needs to be constituted by a plurality of, that is, two or more paths and the number of or the interval between the paths may be adjusted and modified according to the shape of the injection body.

Figure 5:
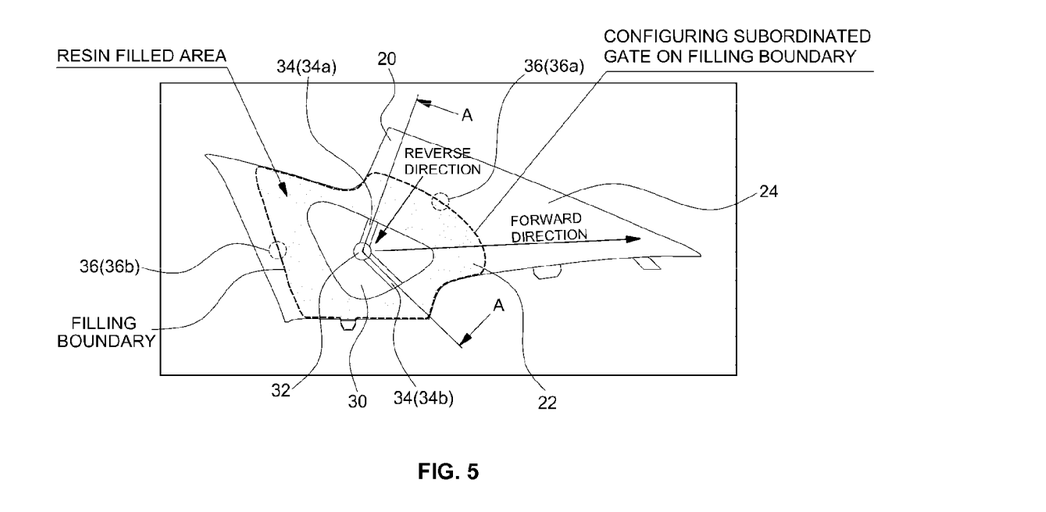
FIG. 5 is a diagram for describing a subordinated gate setting position of the interior material manufacturing device according to the exemplary embodiment of the present invention.

As illustrated in FIG. 5, one or more subordinated gates 36 for secondarily supplying the resin to the filling area part 20 after the resin injection using the reference gate 32 is completed are provided in the filling area part 20.

The subordinated gates 36 are configured and disposed on the edge of the resin filled in the filling area part 20 until a predetermined time (a predetermined reference time) elapses after opening the reference gate 32 in order to supply the resin to the filling area part 20.

In other words, the subordinated gate 36 is positioned at one point on the edge (alternatively, filling boundary) of the resin filled in the filling area part 20 for the predetermined reference time after opening the reference gate 32.

Herein, the reference time, as a time required for the resin filled in the filling area part 20 to reach the subordinated gate 36 after opening the gate, may be determined as a predetermined time to supply the resin between the upper mold and the lower mold by opening the gate at the time of forming the injection body or an optimal time derived by an experiment and evaluation.

When the subordinated gate 36 is configured outside the filling boundary, the resin jetted from the subordinated gate 36 flows in a reverse direction (a direction in which the resin flows from the filling boundary to the non-filling area part) to collide with the resin jetted from the reference gate 32, and as a result, the cloth may be creased.

Herein, referring to FIG. 6A and FIG. 6B, an area in which the resin that flows out from the reference gate is filled in the filling area part for a predetermined reference time and a method that predicts the filling boundary will be described below.

Herein, the filling boundary is the edge of the resin filled in the filling area part 20 for the predetermined reference time and more accurately, not the edge of the filling area part 20 but the edge of the resin formed in the filling area part 20. The filling boundary becomes a boundary that divides an area in which the resin injected through the reference gate 32 is filled and a non-filling area in the filling area part 20.

Figure 6A:
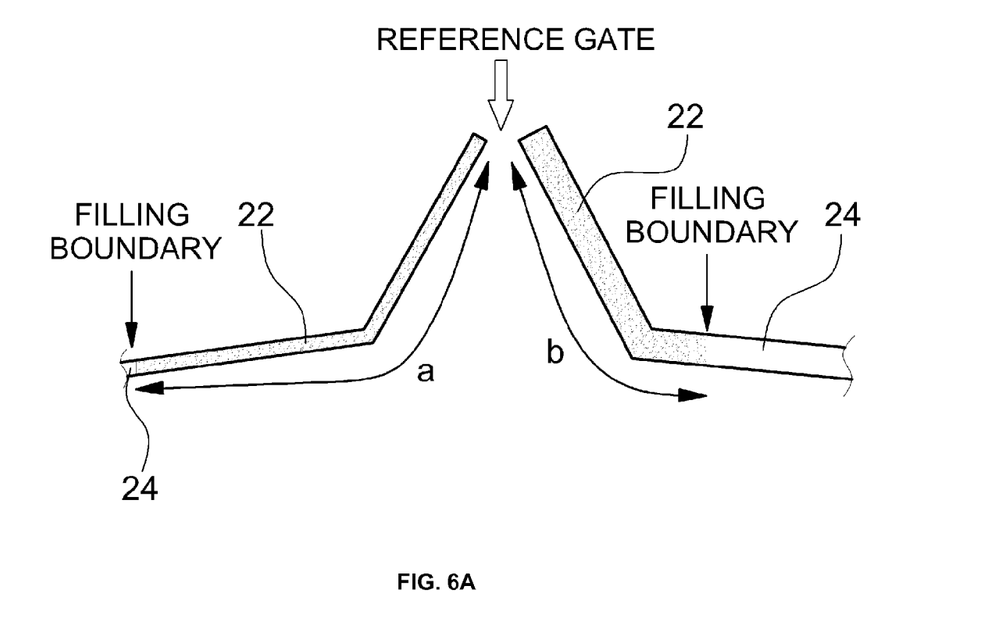
FIG. 6A and FIG. 6B are diagrams for describing a method for predicting a filling area of a resin injected through a reference gate of the interior material manufacturing device according to the exemplary embodiment of the present invention.
Figure 6B:
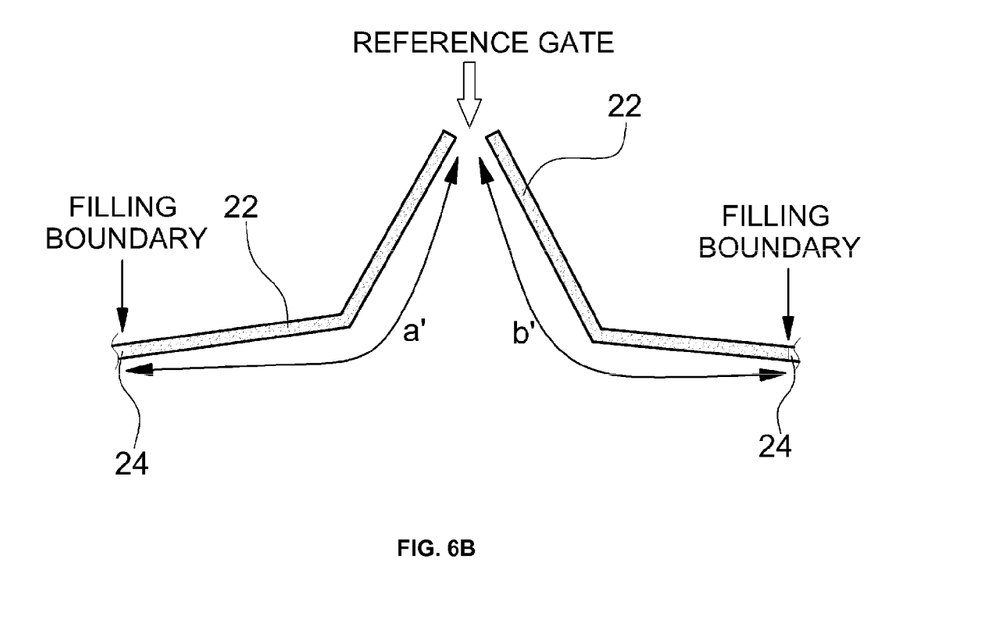

FIG. 6A and FIG. 6B schematically illustrate a cross-section of the filling area part taken along line A-A of FIG. 5, and FIG. 6A illustrates the filling boundary predicted when the height of the filling area part is ununiform and FIG. 6B illustrates the filling boundary predicted when the height of the filling area part is uniform.

When the resin jetted from the reference gate 32 is filled in the filling area part 20, the resin is gradually diffused and flows to the edge of the filling area part 20 while filling the cross-section of the filling area part 20. Therefore, a distance from the edge of (filling boundary) of a partial area (resin filled area) in which the resin is filled for a predetermined reference time to the reference gate 32 may vary depending on the shape of the filling area part 20.

For example, when two gate paths 34 are provided in the non-filling area part 30 as illustrated in FIG. 5, when the height of the filling area part 20 is ununiform, a distance from a filling boundary of a resin filled area 22 which relatively comes close to one gate path 34a to the reference gate 32 and a distance from the filling boundary of the resin filled area 22 which relatively comes close to the other gate path 34b to the reference gate 32 are different from each other as illustrated in FIG. 6A.

When the height of the filling area part 20 is uniform, a distance from the filling boundary of the resin filled area 22 facing one gate path 34a to the reference gate 32 and a distance from the filling boundary of the resin filled area 22 facing the other gate path 34b to the reference gate 32 may be the same as each other as illustrated in FIG. 6B. In other words, a distance by which the resin flows from the reference gate 32 through one gate path 34a and a distance by which the resin flows through the other gate path 34b are the same as each other.

Therefore, when the height of the filling area part 20 is ununiform, the filling boundary of the filling area part 20 may be estimated and predicted as a set of points at which a cross-section of the resin filled in the filling area part 20 is the same and when the height of the filling area part 20 is uniform, the filling boundary of the filling area part 20 may be estimated and predicted as a set of points at which the distance by which the resin flows from the reference gate 32 is the same.

When the height of the filling area part 20 is uniform, the filling boundary may be estimated and predicted as a set of points at which the cross-section of the resin filled in the filling area part 20 is the same.

The resin that flows out from an outlet (alternatively, one edge of the non-filling area part 30) of the gate path 34 flows to and gradually is filled in the filling area part 20 thereararound by pressure and temperature (the pressure and temperature of the resin injected through the reference gate 32).

The number of subordinated gate 36 disposed on the filling boundary predicted as above, in other words, subordinated gates 36 configured on the edge of the resin injected through the reference gate 32 and filled in the filling area part 20 for a predetermined reference time may vary depending on a form in which the resin jetted from the reference gate 32 is filled in the filling area part 20 and the number of subordinated gates 36 configured in the filling area part 20 may be determined as below.

As mentioned as above, herein, the edge of the resin injected through the reference gate 32 and filled in the filling area part 20 for a predetermined reference time is called the filling boundary when the edge of the injected resin is formed not on the edge of the filling area part 20 but inside the filling area part 20 and at least one subordinated gate 36 may be configured and provided on the filling boundary.

Figure 7A:
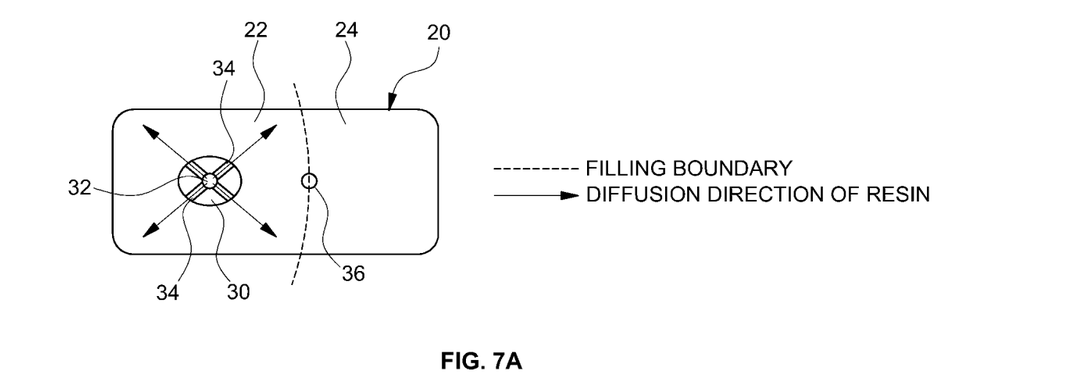
FIG. 7A and FIG. 7B are diagrams for describing a method for determining the set number of subordinated gates of the interior material manufacturing device according to the exemplary embodiment of the present invention.

As illustrated in FIG. 7A, when the resin jetted from the reference gate 32 is filled in the entirety of one space of the filling area part 20, in other words, when the filling area part 20 of which a partial area is filled by the resin that flows out from the reference gate 32 is bidivided into the resin filled area 22 (the area in which the resin is filled) and a resin non-filled area 24 (an area in which the resin is not filled), one filling boundary formed in the filling area part 20 divides the filling area part 20 into the resin filled area 22 and the resin non-filled area 24, and as a result, only one subordinated gate 36 may be configured and disposed in the filling area part 20.

When the entirety of one space of the filling area part 20 is filled by the resin jetted from the reference gate 32, the entirety of the other one space (a space not filled by the resin jetted from the reference gate, that is, the resin non-filled area) of the filling area part 20 may be filled by the resin jetted from the subordinated gate 36 even though the subordinated gate 36 is configured at only one point in the filling area part 20.

Figure 7B:
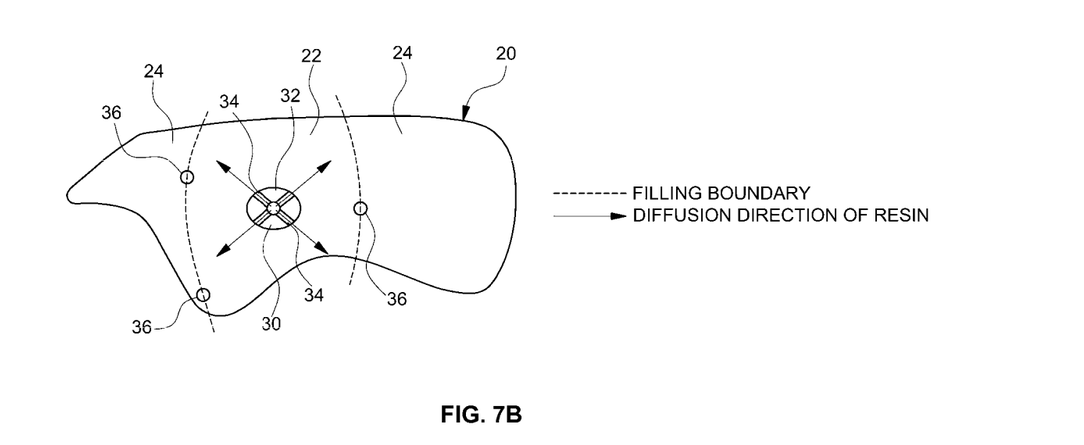

As illustrated in FIG. 7B, when the resin jetted from the reference gate 32 may not reach even any one of both peripheries of the filling area part 20, and as a result, when the resin may not be filled in the entirety of one area of the filling area part 20, in other words, when the filling area part 20 of which a partial area is filled by the resin that flows out from the reference gate 32 is divided into one resin filled area 22 (the area in which the resin is filled) and two or more resin non-filled areas 24 (the areas in which the resin is not filled), two or more filling boundaries need to be formed in the filling area part 20 in order to fill all of the resin non-filled areas 24, and as a result, two or more subordinated gates are configured and disposed in the filling area part 20.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for manufacturing an interior material having a hollow, which forms an injection body below a cloth by inserting the cloth between an upper mold and a lower mold and closing the upper and lower molds and thereafter, injecting a resin between the cloth and the lower mold, the device comprising:

a filling area part in which the resin is fillable and a non-filling area part in which filling the resin is cut off, which are formed between the upper mold and the lower mold, the non-filling area part being positioned in the filling area part; and a reference gate for supplying the resin injected between the upper mold and the lower mold to the filling area part, wherein the reference gate is formed inside the non-filling area part, wherein at least one subordinated gate for secondarily supplying the resin to the filling area part after injecting the resin by using the reference gate are formed in the filling area part.

2. The device of claim 1, wherein at least two gate paths that guide the resin injected between the upper mold and the lower mold to reach the filling area part through the reference gate are formed in the non-filling area part.

3. The device of claim 1, wherein the at least one subordinated gate is disposed on an edge of the resin filled in the filling area part for a predetermined time after the reference gate is opened to supply the resin to the filling area part.

4. The device of claim 1, wherein the at least one subordinated gate is disposed on a filling boundary which is an edge positioned in the filling area part among peripheries of the resin filled in the filling area part for a predetermined time after the reference gate is opened to supply the resin to the filling area part.

5. The device method of claim 1, wherein when the filling area part of which a partial area is filled by the resin jetted from the reference gate is bidivided into a resin filled area in which the resin is filled and a resin non-filled area in which the resin is not filled, only one subordinated gate is configured in the filling area part to fill an entirety of the resin non-filled area.

6. The device method of claim 1, wherein when the filling area part of which a partial area is filled by the resin jetted from the reference gate is divided into one resin filled area in which the resin is filled and two or more resin non-filled areas in which the resin is not filled, at least two subordinated gates are configured in the filling area part to fill all of the resin-non-filled areas.

7. The device method of claim 4, wherein when a height of the filling area part is ununiform, the filling boundary of the filling area part is estimated as a set of points at which a cross-section of the resin filled in the filling area part is a same, and when the height of the filling area part is uniform, the filling boundary of the filling area part is estimated as a set of points at which a distance by which the resin flows from the reference gate is a same.

* * * * *